United States Patent [19]

Aoyagi et al.

[11] 4,268,463
[45] May 19, 1981

[54] METHOD OF PRODUCING A FILM OF HIGH MOLECULAR SUBSTANCE

[75] Inventors: Juuro Aoyagi, Naritanishi; Toshizi Ichikawa, Tokyo, both of Japan

[73] Assignee: Terumo Corporation, Japan

[21] Appl. No.: 931,266

[22] Filed: Aug. 4, 1978

[30] Foreign Application Priority Data

Aug. 12, 1977 [JP] Japan .................................. 52-96724

[51] Int. Cl.³ ............................................... H05B 1/00
[52] U.S. Cl. .................................. 264/22; 204/159.21; 204/159.23; 210/500.2; 264/41; 264/236
[58] Field of Search ..................... 264/22, 28, 236, 41; 204/159.15, 159.21, 159.23; 521/915, 61, 109; 210/500 M

[56] References Cited

U.S. PATENT DOCUMENTS

| | | | |
|---|---|---|---|
| 3,607,692 | 9/1971 | Sanner et al. | 264/28 |
| 3,778,364 | 12/1973 | Mani et al. | 521/915 |
| 3,823,027 | 7/1974 | Wismer et al. | 521/915 |
| 3,876,446 | 4/1975 | Bleckmann et al. | 264/28 |
| 3,880,763 | 4/1975 | Chapman et al. | 521/915 |
| 4,038,350 | 7/1977 | Jaques | 264/22 |
| 4,073,577 | 2/1978 | Hofer | 264/22 |

FOREIGN PATENT DOCUMENTS 1412252 10/1975 United Kingdom .................. 264/41

*Primary Examiner*—Jay H. Woo
*Attorney, Agent, or Firm*—Bacon & Thomas

[57] ABSTRACT

A film of a crosslinked high molecular substance is obtained by irradiating radioactive rays or an electron beam to a solution introduced into a mold. The solution contains an oligomer prepared from a hydroxy monomer selected from the group consisting of hydroxy lower alkyl acrylate, hydroxy lower alkyl methacrylate, hydroxy lower alkyoxy lower alkyl acrylate and hydroxy lower alkoxy lower alkyl methacrylate, and a styrene-based oligomer selected from the group consisting of homooligomer of styrenes and cooligomer of styrenes with unsaturated dicarboxylic acids.

11 Claims, No Drawings

METHOD OF PRODUCING A FILM OF HIGH MOLECULAR SUBSTANCE

BACKGROUND OF THE INVENTION

I. Field of the Invention

This invention relates to a method of producing a film or membrane of a high molecular substance, and more particularly to a method of producing a membrane of a crosslinked high molecular substance suitable for use as a separation membrane.

II. Description of the Prior Art

A high molecular membrane is widely used in the medical field as a membrane adapted for living bodies or as a membrane for separating a mixture of different substances by utilizing reverse osmosis. As a high molecular substance used for such a purpose, particularly excellent is a block copolymer consisting of a hydrophilic monomer block unit and a hydrophobic monomer block unit. In such a block copolymer, the chain length of each block and the ratio of the hydrophilic monomer unit to the hydrophobic monomer unit are very important for enabling the copolymer to be suitable for use for the above-noted purpose.

It is conventional to produce a block copolymer by utilizing a graft polymerization reaction or a block polymerization reaction. In the conventional method, however, it is necessary to use an initiator or a chain transfer agent for carrying out the required polymerization reaction, resulting in restriction in terms of the control of the molecular chain length and of the block unit ratio.

SUMMARY OF THE INVENTION

An object of the present invention is to provide a method of producing a membrane of a high molecular substance free from the above-noted difficulty inherent in the conventional method and capable of readily controlling the chain length of the block unit and the block unit ratio.

The above object and the other objects of the this invention which will be apparent from the following description are achieved by a method of this invention which comprises forming a solution into a thin layer and irradiating radioactive rays or an electron beam to the thin layer, said solution containing an oligomer (A) derived from a hydroxy ester monomer selected from the group consisting of hydroxy lower alkyl acrylate, hydroxy lower alkyl methacrylate, hydroxy lower alkoxy lower alkyl acrylate and hydroxy lower alkoxy lower alkyl methacrylate, and a styrene-based oligomer (B) selected from the group consisting of a homooligomer of styrenes and a cooligomer of styrenes with unsaturated dicarboxylic acids. The irradiation serves to effect a crosslinking reaction.

DETAILED DESCRIPTION OF THE PREFERRED EMBODIMENTS

As described previously, component (A) of the crosslinked copolymer providing a membrane according to this invention is a hydroxy oligomer prepared from hydroxy monomers such as hydroxy lower alkyl acrylate, hydroxy lower alkyl methacrylate, hydroxy lower alkoxy lower alkyl acrylate and hydroxy lower alkoxy lower alkyl methacrylate. The term "lower" used in the specification and the claims implies an organic group having 1 to 5, preferably, 1 to 4 carbon atoms.

Specific compounds used as a hydroxy lower alkyl acrylate in this invention include, for example, 2-hydroxyethyl acrylate, 2-hydroxypropyl acrylate, 3-hydroxypropyl acrylate, 4-hydroxybutyl acrylate, and 5-hydroxypentyl acrylate. Specific compounds providing a suitable hydroxy lower alkyl methacrylate include, for example, 2-hydroxyethyl methacrylate, 2-hydroxypropyl methacrylate, 3-hydroxypropyl methacrylate, 4-hydroxybutyl methacrylate, and 5-hydroxypentyl methacrylate. Specific compounds providing a suitable hydroxy lower alkoxy lower alkyl acrylate include, for example, diethylene glycol monoacrylate, triethylene glycol monoacrylate, tetraethylene glycol monoacrylate, pentaethylene glycol monoacrylate, dipropylene glycol monoacrylate, and tripropylene glycol monoacrylate. Further, specific compounds providing a hydroxy lower alkoxy lower alkyl methacrylate include, for example, diethylene glycol monomethacrylate, triethylene glycol monomethacrylate, tetraethylene glycol monomethacrylate, pentaethylene glycol monomethacrylate, dipropylene glycol monomethacrylate and tripropylene glycol monomethacrylate.

Any of the monomers exemplified above is dissolved in a polar solvent such as methyl cellosolve, methanol, ethanol, and dimethylformamide, and is subjected to reaction in the presence of a radical polymerization initiator so as to obtain the desired oligomer. The reaction mentioned is carried out for 30 minutes to 4 hours at 50° C. to 100° C., preferably, at 60° C. to 90° C. In this reaction stage, it is preferred to set the molar ratio of the solvent to the monomer (solvent/monomer) at 5 to 20. The resultant oligomer has a number average molecular weight ($\overline{Mn}$) ranging between about 500 and about 10,000.

Component (B) of the copolymer providing a membrane according to this invention is a styrene-based oligomer selected from the group consisting of a homooligomer of styrenes and a cooligomer of styrenes with unsaturated dicarboxylic acids. Specific monomer compounds providing a suitable homooligomer of styrenes include, for example, styrene, p-carbomethoxystyrene, o-, m-, and p-methylstyrenes, p-ethylstyrene, p-n-butylstyrene, p-n-hexylstyrene, p-n-octylstyrene, p-n-nonylstyrene, p-n-decylstyrene, p-n-dodecylstyrene, dimethylstyrene, p-methoxystyrene, p-phenylstyrene, p-phenoxystyrene, 2,5-difluorostyrene, p-chlorostyrene and dichlorostyrene. The homooligomer of styrenes suitable for use in this invention has a number average molecular weight ($\overline{Mn}$) of 430 to 2,800.

Any of the monomers exemplified above is dissolved in a solvent such as toluene and xylene and is subjected to reaction in the presence of a radical polymerization initiator so as to obtain the desired homooligomer. It is preferred in this stage to set the molar ratio of the solvent to the monomer (solvent/monomer) at 5 to 20 and to carry out the reaction for 30 minutes to 2 hours at 50° C. to 100° C., preferably, at 60° C. to 80° C.

On the other hand, the cooligomer suitable for this invention has a number average molecular weight ($\overline{Mn}$) of about 500 to about 10,000 and is obtained by the reaction between the above-mentioned styrenes and unsaturated dicarboxylic acids copolymerizable with the styrenes including, for example, maleic anhydride, itaconic acid, citraconic anhydride, and nadic anhydride. Specifically, a mixture of the styrenes ($M_1$) and the unsaturated dicarboxylic acid ($M_2$) is dissolved in a solvent (S) such as toluene and xylene, and the required reaction is carried out in the presence of a radical polymerization initiator for 30 minutes to 2 hours at 50° C. to 100° C., preferably, at 60° C. to 80° C. In this stage, it is preferred to set the molar ratio of $[M_1]/[M_2]$ at 0.1 to 10 and to set the molar ratio of $[s]/[M_1]+[M_2]$ at 5 to 20.

These two kinds of component oligomers (A) and (B), i.e., hydroxy oligomer (A) and styrene-based oligomer (B), are dissolved in a common solvent and the resultant solution is allowed to flow along a flat plate or is poured into a tubular mold, thereby forming a thin layer of the solution to which radiation rays or an electron beam is irradiated for crosslinking these two kinds of oligomers. It is preferred to use dimethylformamide as a suitable common solvent in this step. Since dimethylformamide is capable of dissolving both of these oligomers (A) and (B) satisfactorily, it is possible to provide a homogeneous solution of these oligomers and, thus, to produce a homogeneous high molecular membrane. In addition, dimethylformamide can be removed without difficulty by using a poor solvent such as alcohol or water in the subsequent washing step described later in detail.

A mixing ratio of oligomer (A) to oligomer (B), i.e., a weight ratio of (A)/(B), which can be determined depending on the specific use of the resultant membrane, ranges in general from 0.01 to 90, preferably, from 0.1 to 85. A total concentration of these oligomers (A) and (B) contained in the solution may range is general from 1 to 50% by weight, preferably, from 5 to 30% by weight. Where the total concentration mentioned does not reach 1% by weight, intramolecular crosslinking tends to occur. This renders it difficult to form a membrane; if a membrane has been formed, it is difficult to retain the shape of the membrane. On the other hand, the total concentration exceeding 50% by weight renders the solution unduly viscous, leading to a bad operating efficiency.

Radioactive rays such as γ-ray or an electron beam is irradiated to a layer of the solution at −20° C. to 50° C., preferably at −10° C. to 25° C. so as to cause a crosslinking reaction. The amount of the rays or beam irradiated in this step should range from 0.5 to 10 Mrad, preferably from 1 to 9 Mrad.

The membrane of the polymer crosslinked in three dimensional directions by the irradiation of radioactive rays or electron beam is washed with a poor solvent so as to remove the common solvent mentioned previously. Specific substances providing a suitable poor solvent include, for example, water, methanol, ethanol, isopropanol, n-butanol, sec-butanol, methyl cellosolve, ethyl cellosolve and butyl cellosolve. Generally, amount of the poor solvent is 5 to 1,000 times, preferably, 10 to 500 times as much as that of the common solvent.

Where the membrane of the crosslinked polymer is used in, for example, an ultrafiltration apparatus, the poor solvent is passed through the apparatus before operation thereof for washing the membrane. If a solvent of the material to be treated by the ultrafiltration apparatus is a poor solvent itself, the solution treated is directly passed through the apparatus. In other words, it is unnecessary in this case to wash the membrane in advance. The use of a poor solvent for dissolving the material to be treated is advantageous particularly where the membrane of this invention is used in an apparatus of industrial scale. On the other hand, where the membrane of this invention is used in a medical field, for example, as a dializing membrane, it is desirable to wash in advance the membrane of the crosslinked copolymer with a poor solvent so as to remove the common solvent, the unreacted oligomers, etc. After the washing, the membrane is sufficiently dried under reduced pressure or immersed in flowing water for 5 to 100 hours for additional washing.

Concerning the polymer produced by the conventional block polymerization or graft polymerization, it should be noted that an essential difficulty in terms of sequence control of the block unit in the polymerization step is caused by the properties of the monomers. In contrast, this invention permits mixing oligomers each having a desired molecular weight at an optional mixing ratio depending on the use of the resultant membrane, and applying a crosslinking reaction to the mixture, as described above, with the result that the composition of the crosslinked copolymer is determined by the compositions and mixing ratios of the raw material oligomers. Thus, freedom in the selection of the kind of functional group, in the designation of the quantity of functional group and in sequence control can be expected, rendering it possible to produce a film of any desired property.

Further, this invention permits freely controlling the size of the pore of the membrane by suitably selecting the oligomer concentration of the solution. Concerning the pore size control, it is interesting to note the case where a blood anticoagulating material such as heparin is added to the oligomer solution. In this case, the crosslinked copolymer membrane is allowed to bear pores suitable for the space occupied by the blood anticoagulating material after the washing step of the crosslinked copolymer membrane. If the washed membrane is brought into contact with the blood anticoagulating material again, the blood anticoagulating material is readily supported by the membrane, resulting in that the membrane is enabled to exhibit a blood anticoagulating property.

It should also be noted that the conventional membrane is produced by dissolving a polymer in a suitable solvent, followed by evaporating the solvent. Alternatively, a thermoplastic polymer is shaped under heat into a membrane. The former method is defective in that subtle differences in micro structure occur from portion to portion of the produced membrane because the polymer concentration of the solution is changed in accordance with progress of the evaporation operation. On the other hand, influences of the heating and cooling on the micro structure of the produced membrane are not negligible when it comes to the latter method. In other words, big influences on the performance of the produced membrane are inherent in each of these conventional methods. In contrast, the present invention involves carrying out a three dimensional crosslinking reaction in a homogeneous solution and, thus, is free from the above-noted difficulties inherent in the conventional method.

An additional advantage of the present invention is that irradiation of radioactive rays or an electron beam is utilized for carrying out the crosslinking reaction. In other words, no additive is used in the reaction step, rendering it impossible for an undesired impurity to remain in the membrane and to be eluted out of the membrane. Even if harmful substances are produced as by-products in the crosslinking reaction step, they are completely removed in the washing step of the membrane with a poor solvent. It follows that the membrane produced by the method of this invention is very useful as a separation means employed in reverse osmosis method, ultrafiltration method, molecular filtration method, etc., and as a component of a medical instrument such as a blood dialyzing membrane.

Described in the following are examples of producing the oligomers used in this invention and of producing the membrane according to the method of this invention.

OLIGOMER PRODUCTION

Example A

A three-necked flask equipped with a reflux condenser, a thermometer and a stirrer was charged with 100 g of 2-hydroxyethyl methacrylate, 0.01 g of azobisisobutyronitrile and 200 g of methyl celloselve. The mixture was heated at 90° C. for 3 hours while being stirred so as to carry out the required reaction. After the reaction, 2,000 g of water was added to the reaction mixture so as to precipitate the resultant oligomer. The oligomer thus obtained was washed with 1,000 g of water three times, and, then, dried, thereby obtaining 85 g of oligomer (A) having a number average molecular weight of 9,000.

Example B

A flask similar to that used in Example A was charged with 100 g of 2-hydroxyethyl methacrylate, 0.02 g of azobisisobutyronitrile and 200 g of dimethylformamide. The mixture was heated at 98° C. for 2 hours while being stirred so as to carry out the required reaction. After the reaction, 2,000 g of water was added to the reaction mixture so as to precipitate the resultant oligomer. The oligomer thus obtained was washed with 1,000 g of water three times and, then, dried, thereby obtaining 89 g of oligomer (B) having a number average molecular weight of 7,500.

Example C

A flask similar to that used in Example A was charged with 100 g of diethylene glycol monomethacrylate, 0.01 g of azobisisobutyronitrile and 200 g of methyl cellosolve. The mixture was heated at 90° C. for 3 hours while agitated so as to carry out the required reaction. After the reaction, 2,000 g of water was added to the reaction mixture so as to precipitate the resultant oligomer. The oligomer thus obtained was washed with 1,000 g of water four times and, then, dried, thereby obtaining 280 g of oligomer (C) having a number average molecular weight of 8,900.

Example D

A flask similar to that used in Example A was charged with 100 g of styrene, 1.09 g of azobisisobutyronitrile and 800 g of toluene. The mixture was heated at 90° C. for 1 hour while agitated under a nitrogen atmosphere so as to carry out the required reaction. After the reaction, the reaction mixture was condensed and petroleum ether 10 times as much as the condensed mixture by volume was added to the condensed reaction mixture so as to precipitate the resultant oligomer. The oligomer thus obtained was washed with 500 g of petroleum ether three times and, then, dried, thereby obtaining 93 g of oligomer (D) having a number average molecular weight of 8,000.

Example E

A flask similar to that used in Example A was charged with 100 g of styrene, 2.0 g of azobisisobutyronitrile and 800 g of toluene. The mixture was heated at 90° C. for 1 hour while agitated under a nitrogen atmosphere so as to carry out the required reaction. After the reaction, the reaction mixture was condensed and petroleum ether about 10 times as much as the condensed mixture by volume was added to the condensed reaction mixture so as to precipitate the resultant oligomer. The oligomer thus obtained was washed with 500 g of petroleum ether three times and, then dried, thereby obtaining 82 g of oligomer (E) having a number average molecular weight of 520.

Example F

A flask similar to that used in Example A was charged with 156.22 g of styrene, 147.09 g of maleic anhydride, 3.0 g of azobisisobutyronitrile and 2,400 ml of toluene. The mixture was heated at 90° C. for 1.5 hours while agitated under a nitrogen atmosphere so as to carry out the required reaction. After the reaction, the reaction mixture was condensed and petroleum ether about 10 times as much as the condensed mixture by volume was added to the condensed reaction mixture so as to precipitate the resultant cooligomer. The cooligomer thus obtained was washed with 500 g of petroleum ether three times, thereby obtaining 290 g of styrene-maleic anhydride cooligomer (F) having a number average molecular weight of 7,000.

Example G

A flask similar to that used in Example A was charged with 156.0 g of styrene, 147.0 g of maleic anhydride, 2.0 g of azobisisobutyronitrile and 2,400 ml of toluene. The mixture was heated at 90° C. for 1 hour while agitated under a nitrogen atmosphere so as to carry out the required reaction. After the reaction, the reaction mixture was condensed and petroleum ether about 10 times as much as the condensed mixture by volume was added to the condensed reaction mixture so as to precipitate the resultant cooligomer. The cooligomer thus obtained was washed with 500 g of petroleum ether three times and, then, dried, thereby obtaining 295 g of styrene-maleic anhydride cooligomer having a number average molecular weight of 8,500.

POLYMER FILM PRODUCTION

Examples 1 to 16

Dimethylformamide solutions containing varying amounts of oligomer (A) and cooligomer (F) were prepared first. Specifically, the weight ratios of oligomer (A) to cooligomer (F), i.e., A/F, were set at 60/40, 50/50, 40/60 and 30/70, respectively, in these solutions. Further, the concentrations of (A)+(F) in these solutions were set at 5%, 10%, 20% and 50% by weight, respectively, for each case of the A/F ratios.

Each of the solutions thus prepared was supplied to a planar or tubular mold and then, γ-ray was irradiated to the solution so as to obtain a crosslinked copolymer. Finally, the crosslinked copolymer was washed three times with methanol in an amount 10 times as much as that of the copolymer, followed by drying under reduced pressure for 72 hours, thereby obtaining a sheet or tube of the copolymer as shown in Table 1.

TABLE 1

| Example | A/F Weight ratio | Concentration (wt %) | Irradiation Amount (Mrad) | Membrane thickness (μ) |
|---|---|---|---|---|
| 1 | 60/40 | 5 | 8 | 20.0 |
| 2 | 60/40 | 10 | 8 | 20.2 |

TABLE 1-continued

| Example | A/F Weight ratio | Concentration (wt %) | Irradiation Amount (Mrad) | Membrane thickness (μ) |
|---|---|---|---|---|
| 3 | 60/40 | 20 | 8 | 20.1 |
| 4 | 60/40 | 50 | 8 | 20.0 |
| 5 | 50/50 | 5 | 8 | 20.3 |
| 6 | 50/50 | 10 | 8 | 20.1 |
| 7 | 50/50 | 20 | 8 | 20.4 |
| 8 | 50/50 | 50 | 8 | 20.0 |
| 9 | 40/60 | 5 | 8 | 20.5 |
| 10 | 40/60 | 10 | 8 | 20.0 |
| 11 | 40/60 | 20 | 8 | 20.0 |
| 12 | 40/60 | 50 | 8 | 20.1 |
| 13 | 30/70 | 5 | 8 | 20.2 |
| 14 | 30/70 | 10 | 8 | 20.3 |
| 15 | 30/70 | 20 | 8 | 20.1 |
| 16 | 30/70 | 50 | 8 | 20.3 |

Examples 17 to 44

Dimethylformamide solutions containing varying amounts of oligomer (A) and cooligomer (B) were prepared in just the same fashion as in Examples 1 to 16. Each of these solutions was supplied to a mold, followed by electron beam irradiation thereto so as to obtain a crosslinked copolymer. Finally, the crosslinked copolymer was washed three times with methanol in an amount 10 times as much as that of the copolymer, followed by drying under reduced pressure for 72 hours, thereby obtaining a membrane as shown in Table 2.

TABLE 2

| Example | A/F weight ratio | Concentration (Wt %) | Irradiation Amount (Mrad) | Membrane thickness (μ) |
|---|---|---|---|---|
| 17 | 60/40 | 5 | 7 | 21.0 |
| 18 | 60/40 | 10 | 7 | 21.0 |
| 19 | 60/40 | 20 | 7 | 21.2 |
| 20 | 60/40 | 50 | 7 | 21.1 |
| 21 | 50/50 | 5 | 7 | 21.0 |
| 22 | 50/50 | 10 | 7 | 21.2 |
| 23 | 50/50 | 20 | 7 | 21.2 |
| 24 | 50/50 | 50 | 7 | 21.3 |
| 25 | 40/60 | 5 | 7 | 21.0 |
| 26 | 40/60 | 10 | 7 | 21.1 |
| 27 | 40/60 | 20 | 7 | 21.2 |
| 28 | 40/60 | 50 | 7 | 21.3 |
| 29 | 30/70 | 5 | 8 | 21.2 |
| 30 | 30/70 | 10 | 8 | 21.0 |
| 31 | 30/70 | 20 | 8 | 21.1 |
| 32 | 30/70 | 50 | 8 | 21.3 |
| 33 | 60/40 | 5 | 10 | 21.0 |
| 34 | 60/40 | 10 | 10 | 21.0 |
| 35 | 60/40 | 20 | 10 | 21.1 |
| 36 | 60/40 | 50 | 10 | 21.2 |
| 37 | 50/50 | 5 | 0.1 | 21.1 |
| 38 | 50/50 | 10 | 0.1 | 21.0 |
| 39 | 50/50 | 20 | 0.1 | 21.2 |
| 40 | 50/50 | 50 | 0.1 | 21.3 |
| 41 | 40/60 | 5 | 1 | 21.0 |
| 42 | 40/60 | 10 | 1 | 21.1 |
| 43 | 40/60 | 20 | 1 | 21.2 |
| 44 | 40/60 | 50 | 1 | 21.3 |

The membrane obtained in Examples 1 to 44 were subjected to dialysis tests. In these tests, an aqueous solution containing 100 mg/dl of urea nitrogen (BUN) i.e., nitrogen contained in urea, 2 mg/dl of vitamin $B_{12}$ ($VB_{12}$) and 0.9% of sodium chloride was used instead of blood and water was used as the dialysate. Specifically the aqueous solution mentioned and water were passed in counter current fashion with the polymer membrane of this invention interposed therebetween so as to evaluate the dialyzing capacity of the membrane. The flowing directions of these two fluids were parallel with the surface of the membrane. Table 3 shows the results of the tests.

Incidentally, the dialyzing capacity shown in Table 3 was determined by the following equation;

$$\text{Clearance Value (ml/min)} = \frac{C_{Bi} - C_{Bo}}{C_{Bi}} \times Q_B$$

where,

"$C_{Bi}$" is the concentration of BUN or $VB_{12}$ contained in the aqueous solution at the inlet port of the dialyzing cell, "$C_{Bo}$" is the concentration of BUN or $VB_{12}$ contained in the aqueous solution at the outlet port of the dialyzing cell, and "$Q_B$" is the flow rate of the aqueous solution.

In these dialysis tests, the flow rate of the dialyzate (water) was maintained at 500 ml/min and the internal temperature of the dialyzing cell was kept at 37° C. Further, colorimetry was employed for determining the BUN or $VB_{12}$ concentration of the aqueous solution at the outlet port of the dialyzing cell.

Table 3 clearly shows that the polymer membrane according to the method of this invention exhibits prominently high dialysis capacity. Incidentally, the clearance values for BUN and $VB_{12}$ were 170 to 180 and 40 to 45, respectively, where a regenerated cellulose film was used instead of the polymer membrane of this invention.

TABLE 3

(Dialysis Capacity of Polymer Membrane)

| Example | BUN (ml/min) | $VB_{12}$ (ml/min) |
|---|---|---|
| 1 | 197 | 68 |
| 2 | 196 | 68 |
| 3 | 195 | 67 |
| 4 | 192 | 65 |
| 5 | 196 | 68 |
| 6 | 195 | 67 |
| 7 | 193 | 66 |
| 8 | 192 | 66 |
| 9 | 195 | 65 |
| 10 | 194 | 64 |
| 11 | 194 | 64 |
| 12 | 193 | 63 |
| 13 | 191 | 63 |
| 14 | 190 | 62 |
| 15 | 189 | 60 |
| 16 | 189 | 59 |
| 17 | 198 | 68 |
| 18 | 197 | 68 |
| 19 | 195 | 68 |
| 20 | 193 | 67 |
| 21 | 197 | 68 |
| 22 | 196 | 67 |
| 23 | 196 | 67 |
| 24 | 195 | 66 |
| 25 | 196 | 67 |
| 26 | 196 | 67 |
| 27 | 195 | 65 |
| 28 | 194 | 64 |
| 29 | 195 | 65 |
| 30 | 194 | 65 |
| 31 | 193 | 64 |
| 32 | 190 | 61 |
| 33 | 196 | 67 |
| 34 | 196 | 64 |
| 35 | 193 | 63 |
| 36 | 192 | 62 |
| 37 | 197 | 69 |
| 38 | 196 | 68 |
| 39 | 196 | 68 |

TABLE 3-continued (Dialysis Capacity of Polymer Membrane)

| Example | BUN (ml/min) | VB$_{12}$ (ml/min) |
|---|---|---|
| 40 | 195 | 67 |
| 41 | 197 | 69 |
| 42 | 197 | 69 |
| 43 | 196 | 68 |
| 44 | 195 | 67 |

Examples 45 to 60

Experiments were conducted as in Examples 17 to 44 except that oligomer (B) and cooligomer (G) were used instead of oligomer (A) and cooligomer (F) used in Examples 17 to 44, thereby obtaining the polymer membranes as shown in Table 4.

TABLE 4

| Example | B/G (weight ratio) | Concentration (wt.%) | Irradiation amount (Mrad) | Membrane thickness ($\mu$) |
|---|---|---|---|---|
| 45 | 60/40 | 5 | 8.5 | 20.0 |
| 46 | 60/40 | 10 | 8.5 | 20.1 |
| 47 | 60/40 | 20 | 8.5 | 20.3 |
| 48 | 60/40 | 50 | 8.5 | 20.1 |
| 49 | 50/50 | 5 | 8.5 | 20.2 |
| 50 | 50/50 | 10 | 8.5 | 20.0 |
| 51 | 50/50 | 20 | 8.5 | 20.3 |
| 52 | 50/50 | 50 | 8.5 | 20.1 |
| 53 | 40/60 | 5 | 8.5 | 20.1 |
| 54 | 40/60 | 10 | 8.5 | 20.2 |
| 55 | 40/60 | 20 | 8.5 | 20.0 |
| 56 | 40/60 | 50 | 8.5 | 20.1 |
| 57 | 30/70 | 5 | 8.5 | 20.1 |
| 58 | 30/70 | 10 | 8.5 | 20.3 |
| 59 | 30/70 | 20 | 8.5 | 20.1 |
| 60 | 30/70 | 50 | 8.5 | 20.0 |

Examples 61 to 76

Experiments were conducted as in Examples 1 to 16 except that oligomer (C) and oligomer (E) were used instead of oligomer (A) and cooligomer (F) used in Examples 1 to 16, thereby obtaining the polymer membranes as shown in Table 5.

TABLE 5

| Example | C/E (weight ratio) | Concentration (wt.%) | Irradiation amount (Mrad) | Membrane thickness ($\mu$) |
|---|---|---|---|---|
| 61 | 60/40 | 5 | 9.0 | 20.0 |
| 62 | 60/40 | 10 | 9.0 | 20.0 |
| 63 | 60/40 | 20 | 9.0 | 20.3 |
| 64 | 60/40 | 50 | 9.0 | 20.3 |
| 65 | 50/50 | 5 | 9.0 | 20.1 |
| 66 | 50/50 | 10 | 9.0 | 20.2 |
| 67 | 50/50 | 20 | 9.0 | 20.2 |
| 68 | 50/50 | 50 | 9.0 | 20.1 |
| 69 | 40/60 | 5 | 9.0 | 20.1 |
| 70 | 40/60 | 10 | 9.0 | 20.1 |
| 71 | 40/60 | 20 | 9.0 | 20.3 |
| 72 | 40/60 | 50 | 9.0 | 20.0 |
| 73 | 30/70 | 5 | 9.0 | 20.0 |
| 74 | 30/70 | 10 | 9.0 | 20.0 |
| 75 | 30/70 | 20 | 9.0 | 20.1 |
| 76 | 30/70 | 50 | 9.0 | 20.3 |

Examples 77 to 92

Experiments were conducted as in Examples 45 to 60 except that oligomer (A) and oligomer (D) were used instead of oligomer (B) and cooligomer (G) used in Examples 45 to 60, thereby obtaining the polymer membranes as shown in Table 6.

TABLE 6

| Example | A/D (weight ratio) | Concentration (wt.%) | Irradiation amount (Mrad) | Membrane thickness ($\mu$) |
|---|---|---|---|---|
| 77 | 60/40 | 5 | 9.5 | 20.0 |
| 78 | 60/40 | 10 | 9.5 | 20.0 |
| 79 | 60/40 | 20 | 9.5 | 20.1 |
| 80 | 60/40 | 50 | 9.5 | 20.3 |
| 81 | 50/50 | 5 | 9.5 | 20.0 |
| 82 | 50/50 | 10 | 9.5 | 20.2 |
| 83 | 50/50 | 20 | 9.5 | 20.1 |
| 84 | 50/50 | 50 | 9.5 | 20.3 |
| 85 | 40/60 | 5 | 9.5 | 20.1 |
| 86 | 40/60 | 10 | 9.5 | 20.0 |
| 87 | 40/60 | 20 | 9.5 | 20.1 |
| 88 | 40/60 | 50 | 9.5 | 20.3 |
| 89 | 30/70 | 5 | 9.5 | 20.1 |
| 90 | 30/70 | 10 | 9.5 | 20.1 |
| 91 | 30/70 | 20 | 9.5 | 20.3 |
| 92 | 30/70 | 50 | 9.5 | 20.1 |

We we claim is:

1. A method of producing a membrane of a high molecular substance, comprising forming a solution containing a hydroxy oligomer and a styrene-based oligomer into a thin layer, and irradiating radioactive rays or an electron beam to said thin layer so as to cause crosslinking between said hydroxy oligomer and styrene-based oligomer, said hydroxy oligomer being derived from a hydroxy monomer selected from the group consisting of hydroxy lower alkyl acrylate, hydroxy lower alkyl methacrylate, hydroxy lower alkoxy lower alkyl acrylate and hydroxy lower alkoxy lower alkyl methacrylate, and the styrene-based oligomer being selected from the group consisting of homooligomers of styrenes and cooligomers of styrenes with unsaturated dicarboxylic acids.

2. The method according to claim 1, wherein the hydroxy oligomer has a number average molecular weight falling within the range of between about 500 and about 10,000.

3. The method according to claim 1, wherein the styrene-based oligomer is a homooligomer having a number average molecular weight of 430 to 2,800.

4. The method according to claim 1, wherein the styrene-based oligomer is a cooligomer having a number average molecular weight falling within the range of between about 500 and about 10,000.

5. The method according to claim 1, wherein the weight ratio of the hydroxy oligomer to the styrene-based oligomer ranges from 0.01 to 90.

6. The method according to claim 1, wherein dimethylformamide is used as a solvent for the solution.

7. The method according to claim 1, wherein the total amount of the hydroxy oligomer and the styrene-based oligomer ranges from 1% to 50% by weight of the solution.

8. The method according to claim 1, wherein $\gamma$-ray or electron beam is irradiated to the thin layer of the solution.

9. The method according to any one of claims 1 to 8, wherein the radioactive rays or an electron beam is an amount of 0.5 to 10 Mrad is irradiated to the thin layer of the solution.

10. The method according to claim 1, wherein the solution contains heparin.

11. The method according to claim 1, which further comprises washing the membrane of the crosslinked high molecular substance with a poor solvent so as to remove the solvent of the solution.

* * * * *

UNITED STATES PATENT AND TRADEMARK OFFICE
CERTIFICATE OF CORRECTION

PATENT NO. : 4,268,463

DATED : May 19, 1981

INVENTOR(S) : Aoyagi et al

It is certified that error appears in the above—identified patent and that said Letters Patent is hereby corrected as shown below:

Column 10, line 20, cancel beginning with "1. A method of" to and including "dicarboxylic acids." at line 34, and insert the following claim:

1. A method of producing a membrane of a high molecular weight substance comprising forming a solution containing a hydroxy oligomer and a styrene-based oligomer into a thin layer, and irradiating said thin layer of solution while in the liquid state with radioactive rays or an electron beam so as to cause cross-linking between said hydroxy oligomer and styrene-based oligomer, said hydroxy oligomer being derived from a hydroxy monomer selected from the group consisting of hydroxy lower alkyl acrylate, hydroxy lower alkyl methacrylate, hydroxy lower alkoxy lower alkyl acrylate and hydroxy lower alkoxy lower alkyl methacrylate, and the styrene-based oligomer being selected from the group consisting of homooligomers of styrenes and cooligomers of styrenes with unsatura-

UNITED STATES PATENT AND TRADEMARK OFFICE
CERTIFICATE OF CORRECTION

PATENT NO. :     4,268,463

DATED      :     May 19, 1981

INVENTOR(S) :    Aoyagi et al

It is certified that error appears in the above—identified patent and that said Letters Patent is hereby corrected as shown below:

ted dicarboxylic acids.

Column 10, line 59, which is in claim 9, change "is" to --in--.

Signed and Sealed this

Tenth Day of November 1981

[SEAL]

*Attest:*

*Attesting Officer*

GERALD J. MOSSINGHOFF

*Commissioner of Patents and Trademarks*